(12) United States Patent
Yang (10) Patent No.: US 11,950,254 B2
(45) Date of Patent: Apr. 2, 2024

(54) METHOD AND DEVICE FOR CONFIGURING DATA TRANSMISSION MODE, AND METHOD AND DEVICE FOR DATA TRANSMISSION

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 418 days.

(21) Appl. No.: 17/601,379

(22) PCT Filed: Apr. 8, 2019

(86) PCT No.: PCT/CN2019/081779
§ 371 (c)(1),
(2) Date: Oct. 4, 2021

(87) PCT Pub. No.: WO2020/206595
PCT Pub. Date: Oct. 15, 2020

(65) Prior Publication Data
US 2022/0217752 A1    Jul. 7, 2022

(51) Int. Cl.
*H04W 72/23* (2023.01)
*H04W 72/12* (2023.01)
*H04W 28/02* (2009.01)

(52) U.S. Cl.
CPC .......... *H04W 72/23* (2023.01); *H04W 72/12* (2013.01); *H04W 28/0278* (2013.01)

(58) Field of Classification Search
CPC .. H04W 72/23; H04W 72/12; H04W 28/0278
See application file for complete search history.

(56) References Cited

U.S. PATENT DOCUMENTS

2004/0228313 A1\* 11/2004 Cheng ............... H04L 1/1887
370/335
2016/0044737 A1\* 2/2016 Kwon ............... H04W 76/27
370/328

(Continued)

FOREIGN PATENT DOCUMENTS

CN          109565494 A     4/2019
EP            3301986 A1    4/2018

OTHER PUBLICATIONS

Indian Patent Application No. 202147050372Office Action dated Apr. 25, 2022, 6 pages.

(Continued)

*Primary Examiner* — Brenda H Pham
(74) *Attorney, Agent, or Firm* — COZEN O'CONNOR (57) ABSTRACT

A method for configuring a data transmission mode includes generating first configuration information and second configuration information for a preset link, the first configuration information including information indicating whether preset information configured for each logical channel of the preset link is shielded, and/or a data transmission mode of each logical channel, the data transmission mode including a first transmission mode and a second transmission mode, and the second configuration information including a first scheduling mode corresponding to the first transmission mode, a resource pool provided by the first scheduling mode, and a second scheduling mode corresponding to the second transmission mode.

19 Claims, 9 Drawing Sheets

(56) References Cited

U.S. PATENT DOCUMENTS

2018/0110066 A1* 4/2018 Luo .......................... H04L 1/00
2018/0213550 A1* 7/2018 Li ..................... H04W 72/0453

OTHER PUBLICATIONS

European Patent Application No. 19923955.9 Search and Opinion dated Mar. 25, 2022, 14 pages.
VIVO "Discussion on support of simultaneous mode 1 and mode 2" 3GPP TSG-RAN WG2 Meeting #103; R2-1901118, Feb. 2019; 4 pages.
PCT/CN2019/081779 English translation of the International Search Report dated Dec. 20, 2019, 2 pages.

* cited by examiner

METHOD AND DEVICE FOR CONFIGURING DATA TRANSMISSION MODE, AND METHOD AND DEVICE FOR DATA TRANSMISSION

CROSS-REFERENCE TO RELATED APPLICATION

This application is a national phase of International Application No. PCT/CN2019/081779, filed on Apr. 8, 2019, the entire contents of which are incorporated herein by reference.

TECHNICAL FIELD

The disclosure relates to the field of communication technologies, and particularly to a method and an apparatus for configuring a data transmission mode, a method and an apparatus for data transmission, a base station, user equipment (UE) and a computer-readable storage medium.

BACKGROUND

There are two data transmission modes on a Sidelink in $4^{th}$ generation (4G) mobile communication technologies. A difference of the two data transmission modes lies in how resources are selected for transmitting. One of the solutions is that resources for transmitting may be dynamically scheduled through a network and the other is that user equipment (UE) may independently select resources for transmitting from a resource pool that is broadcasted through network.

The resources for transmitting may be dynamically scheduled through a network, which can be understood to mean that network dynamically allocates the resources for transmitting on the Sidelink for the UE based on a buffer status report (BSR) of the UE. The UE independently selects the resources for transmitting from the resource pool that is broadcasted through network, which can be understood to mean that the UE randomly and independently selects the resources for transmitting from the resource pool configured or pre-configured through network.

To ensure services with different Quality of Service (QoS) requirements in 5th generation (5G) mobile communication technologies, requirements for both data transmission modes are enhanced.

SUMMARY

According to a first aspect of embodiments of the disclosure, a method for configuring a data transmission mode is provided. The method is applicable to a base station.

The method includes generating first configuration information and second configuration information for a preset link, the first configuration information including information indicating whether preset information configured for each logical channel of the preset link is shielded, and/or a data transmission mode of each logical channel, the data transmission mode including a first transmission mode and a second transmission mode, and the second configuration information including a first scheduling mode corresponding to the first transmission mode, a resource pool provided by the first scheduling mode, and a second scheduling mode corresponding to the second transmission mode.

The method further includes transmitting the first configuration information and the second configuration information to user equipment (UE).

According to a second aspect of embodiments of the disclosure, a method for data transmission is provided. The method is applicable to UE.

The method includes determining data transmission modes for a first logical channel and a second logical channel of a preset link respectively based on first configuration information received in advance, in response to detecting data arrival in the first logical channel and the second logical channel simultaneously.

The method further includes transmitting data in the first logical channel based on second configuration information and the data transmission mode determined for the first logical channel.

The method further includes transmitting data in the second logical channel based on the second configuration information and the data transmission mode determined for the second logical channel.

According to a third aspect of embodiments of the disclosure, a base station is provided.

The base station includes a processor.

The base station further includes a memory configured to store instructions executable by the processor.

The processor is configured to perform the following actions.

The processor is configured to generate first configuration information and second configuration information for a preset link, the first configuration information including information indicating whether preset information configured for each logical channel of the preset link is shielded, and/or a data transmission mode of each logical channel, the data transmission mode including a first transmission mode and a second transmission mode, and the second configuration information including a first scheduling mode corresponding to the first transmission mode, a resource pool provided by the first scheduling mode, and a second scheduling mode corresponding to the second transmission mode.

The processor is configured to transmit the first configuration information and the second configuration information to user equipment (UE).

According to a fourth aspect of embodiments of the disclosure, UE is provided.

The UE includes a processor.

The UE further includes a memory configured to store instructions executable by the processor.

The processor is configured to perform the following actions.

The processor is configured to determine data transmission modes for a first logical channel and a second logical channel of a preset link respectively based on first configuration information received in advance, in response to detecting data arrival in the first logical channel and the second logical channel simultaneously.

The processor is configured to transmit data in the first logical channel based on second configuration information and the data transmission mode determined for the first logical channel.

The processor is configured to transmit data in the second logical channel based on the second configuration information and the data transmission mode determined for the second logical channel.

According to a fifth aspect of embodiments of the disclosure, a non-transitory computer-readable storage medium is provided. The non-transitory computer-readable storage medium has stored therein computer instructions. When the instructions are executed by the processor, actions in the method for configuring the data transmission mode are performed.

According to a sixth aspect of embodiments of the disclosure, a non-transitory computer-readable storage medium is provided. The non-transitory computer-readable storage medium has stored therein computer instructions. When the instructions are executed by the processor, actions in the method for data transmission mode are performed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Figure 1:
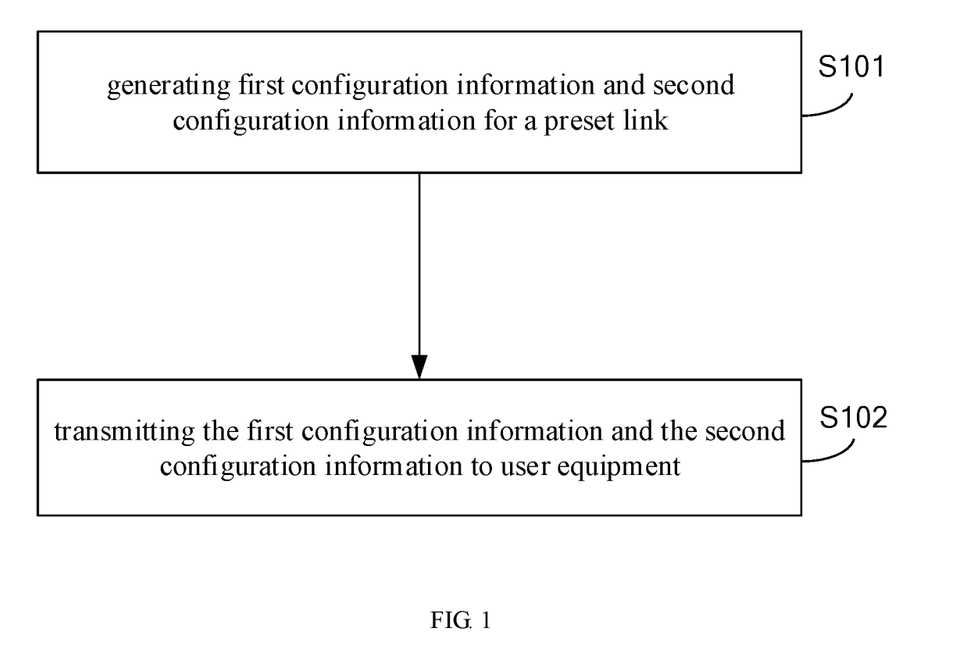
FIG. 1 is a flowchart illustrating a method for configuring a data transmission mode according to an example embodiment of the disclosure.

FIG. 1 is a flowchart illustrating a method for configuring a data transmission mode according to an example embodiment of the disclosure. The embodiments may be described from a base station perspective. As illustrated in FIG. 1, the method includes the following actions.

At block S101, first configuration information and second configuration information for a preset link, are generated. The first configuration information includes information indicating whether preset information configured for each logical channel of the preset link is shielded, and/or a data transmission mode of each logical channel. The data transmission mode includes a first transmission mode and a second transmission mode. The second configuration information includes a first scheduling mode corresponding to the first transmission mode, a resource pool provided by the first scheduling mode, and a second scheduling mode corresponding to the second transmission mode.

The preset link may be a Sidelink. The preset information may be a buffer status report (BSR). The first transmission mode may be an independently-selected transmission mode. The second transmission mode may be a dynamic scheduling transmission mode.

In the embodiments, a Sidelink logical channel that is configured with the BSR shielded may not trigger the BSR.

In the embodiments, whether the preset information is shielded may be indicated by indication information, for example, may be indicated by indication information of 1 bit. When the indication information is 1, it represents that the preset information is shielded. When the indication information is 0, it represents that the preset information is not shielded.

In addition, whether the preset information is shielded is indicated in other ways, for example, may be indicated by a default configuration logical channel group.

In the embodiments, the first configuration information may include the information indicating whether the preset information configured for each logical channel of the preset link is shielded and the data transmission mode of each logical channel. The first configuration information may only include the information indicating whether the preset information configured for each logical channel of the preset link is shielded. The first configuration information may only include the data transmission mode of each logical channel.

When transmission modes of all logical channels of the preset link are all the dynamic scheduling modes, the first configuration information may only include the information indicating whether the preset information configured for each logical channel of the preset link is shielded.

In order to enable the UE transmit data with two data transmission modes simultaneously, the base station configures two resource scheduling modes for the UE simultaneously. The first scheduling mode corresponds to the first transmission mode. When the first transmission mode is an independently-selected transmission mode, the first scheduling mode is an independently-selected scheduling mode. The second scheduling mode corresponds to the second transmission mode. When the second transmission mode is a dynamic scheduling transmission mode, the second scheduling mode is a dynamic scheduling mode.

The resource pool provided by the first scheduling mode is a time domain resource range for the UE to automatically select.

At block S102, the first configuration information and the second configuration information are transmitted to the UE.

The first configuration information and the second configuration information are carried in an RRC (Radio Resource Control) message.

In the embodiments, the base station transmits the first configuration information and the second configuration information to the UE after generating the first configuration information for the preset link such as the Sidelink, thereby providing conditions for the UE to transmit data with two data transmission modes simultaneously.

In the above embodiments, the first configuration information and the second configuration information may be generated for the preset link and transmitted to the UE. The first configuration information includes two transmission modes. The two transmission modes may satisfy different service requirements and be supported simultaneously to enable the terminal to support more services simultaneously.

Figure 2:
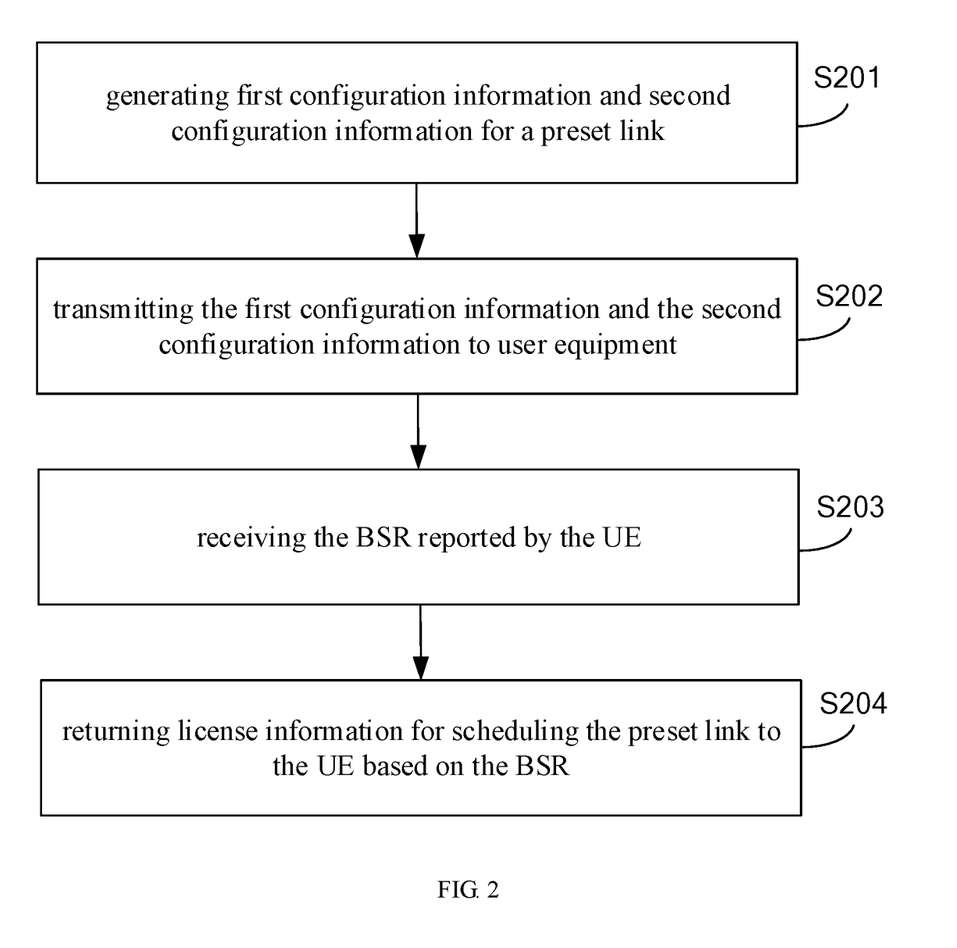
FIG. 2 is a flowchart illustrating another method for configuring a data transmission mode according to an example embodiment of the disclosure.

FIG. 2 is a flowchart illustrating another method for configuring a data transmission mode according to an example embodiment of the disclosure. As illustrated in FIG. 2, on the basis of the embodiments in FIG. 1, the method may further include the following actions.

At block S201, first configuration information and second configuration information for a preset link, are generated.

At block S202, the first configuration information and the second configuration information are transmitted to the UE.

At block S203, the BSR reported by the UE is received.

At block S204, license information for scheduling the preset link is returned to the UE based on the BSR.

When the base station configures information indicating that the BSR is shielded and a dynamic scheduling transmission mode for a certain logical channel of the preset link, for example the Sidelink, and when there are data arrival on the logical channel, the UE may trigger and report the BSR based on the existing rule. The base station may return the license information for scheduling the preset link to the UE based on the BSR. The UE may schedule a resource to transmit data of the logical channel after receiving the license information.

In the above embodiments, the BSR reported by the UE is received, and the license information for scheduling the preset link is returned to the UE so that the UE may implement data transmission in time.

Figure 3:
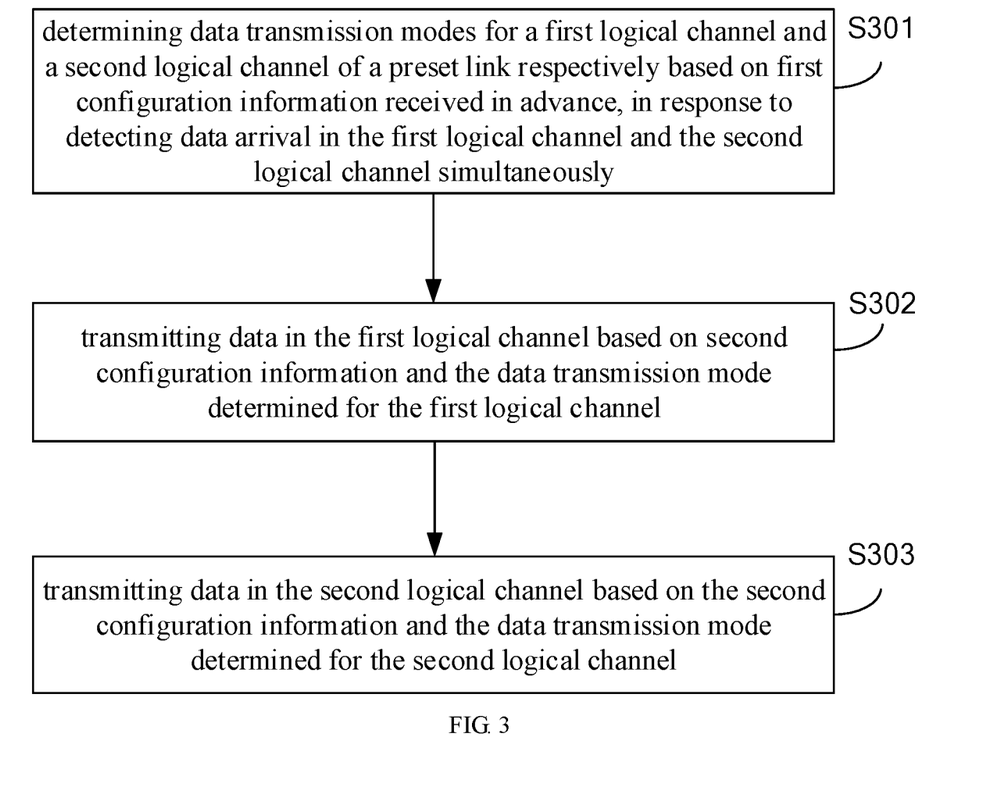
FIG. 3 is a flowchart illustrating a method for data transmission according to an example embodiment of the disclosure.

FIG. 3 is a flowchart illustrating a method for data transmission according to an example embodiment of the disclosure. The embodiments may be described from a side of UE. As illustrated in FIG. 3, the method includes the following.

At block S301, data transmission modes for a first logical channel and a second logical channel of a preset link are determined respectively based on first configuration information received in advance, in response to detecting data arrival in the first logical channel and the second logical channel simultaneously.

The preset link may be a Sidelink. The preset information may be a BSR.

In the embodiments, a Sidelink logical channel that is configured with the BSR shielded may not trigger the BSR.

Figure 4:
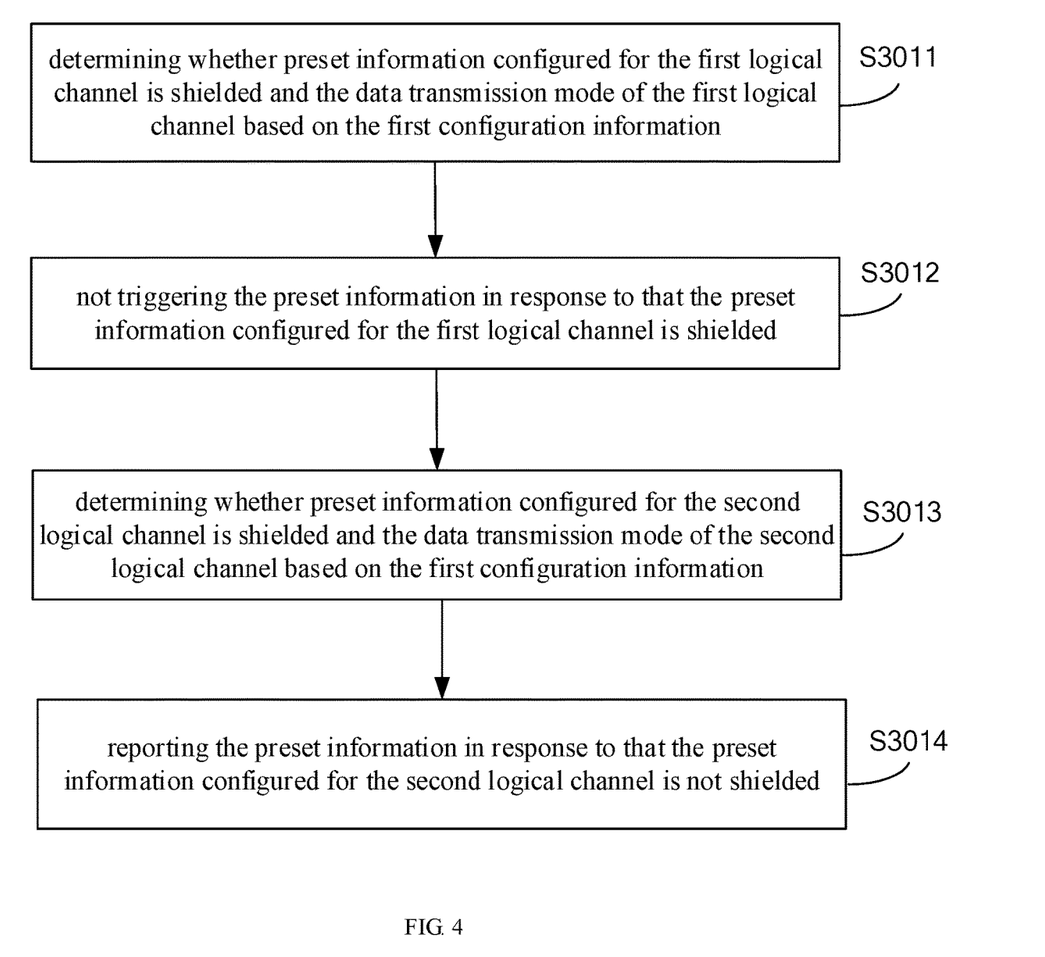
FIG. 4 is a flowchart illustrating determining data transmission modes for a first logical channel and a second logical channel respectively based on first configuration information according to an example embodiment of the disclosure.

As illustrated in FIG. 4, determining the data transmission modes for the first logical channel and the second logical channel of the preset link respectively based on the first configuration information received in advance may include the following.

At block S3011, it is determined whether preset information configured for the first logical channel is shielded and the data transmission mode of the first logical channel based on the first configuration information.

At block S3012, the preset information is not triggered in response to that the preset information configured for the first logical channel is shielded.

At block S3013, it is determined whether preset information configured for the second logical channel is shielded and the data transmission mode of the second logical channel based on the first configuration information.

At block S3014, the information is reported in response to that the preset information configured for the second logical channel is not shielded.

In the embodiments, the data transmission modes are determined for the first logical channel and the second logical channel respectively, thereby providing conditions for subsequent transmission data.

At block S302, data in the first logical channel are transmitted based on second configuration information and the data transmission mode determined for the first logical channel.

When the data transmission mode of the first logical channel is the first transmission mode, the data in the first logical channel are transmitted based on the second configuration information and the data transmission mode determined for the first logical channel, which may include: selecting a resource from a resource pool provided by a first scheduling mode corresponding to the first transmission mode based on the second configuration information, and transmitting the data in the first logical channel through the selected resource.

At block S303, data in the second logical channel are transmitted based on the second configuration information and the data transmission mode determined for the second logical channel.

When the data transmission mode of the second logical channel is the second transmission mode, the data in the second logical channel are transmitted based on the second configuration information and the data transmission mode determined for the second logical channel, which may include: receiving license information for scheduling the preset link, returned by a base station based on the preset information; and scheduling a resource dynamically based on the license information and a second scheduling mode corresponding to the second transmission mode, and transmitting the data in the second logical channel through the scheduled resource.

Optionally, the method may further include: receiving the first configuration information and the second configuration information from a base station. The first configuration information includes information indicating whether preset information configured for each logical channel of the preset link is shielded, and/or a data transmission mode of each logical channel. The data transmission mode includes a first transmission mode and a second transmission mode. The second configuration information includes a first scheduling mode corresponding to the first transmission mode, a resource pool provided by the first scheduling mode, and a second scheduling mode corresponding to the second transmission mode.

In the above embodiments, when the data arrival in the first logical channel and the second logical channel of the preset link simultaneously are detected, the data transmission modes are determined for the first logical channel and the second logical channel based on the first configuration information received in advance, and the data in the first logical channel are transmitted based on the second configuration information and the data transmission mode determined for the first logical channel, and the data in the second logical channel are transmitted on the second configuration information and the data transmission mode determined for the second logical channel, thereby enabling the simultaneous use of two data transmission modes to transmit data and simultaneously supporting more services.

Figure 5:
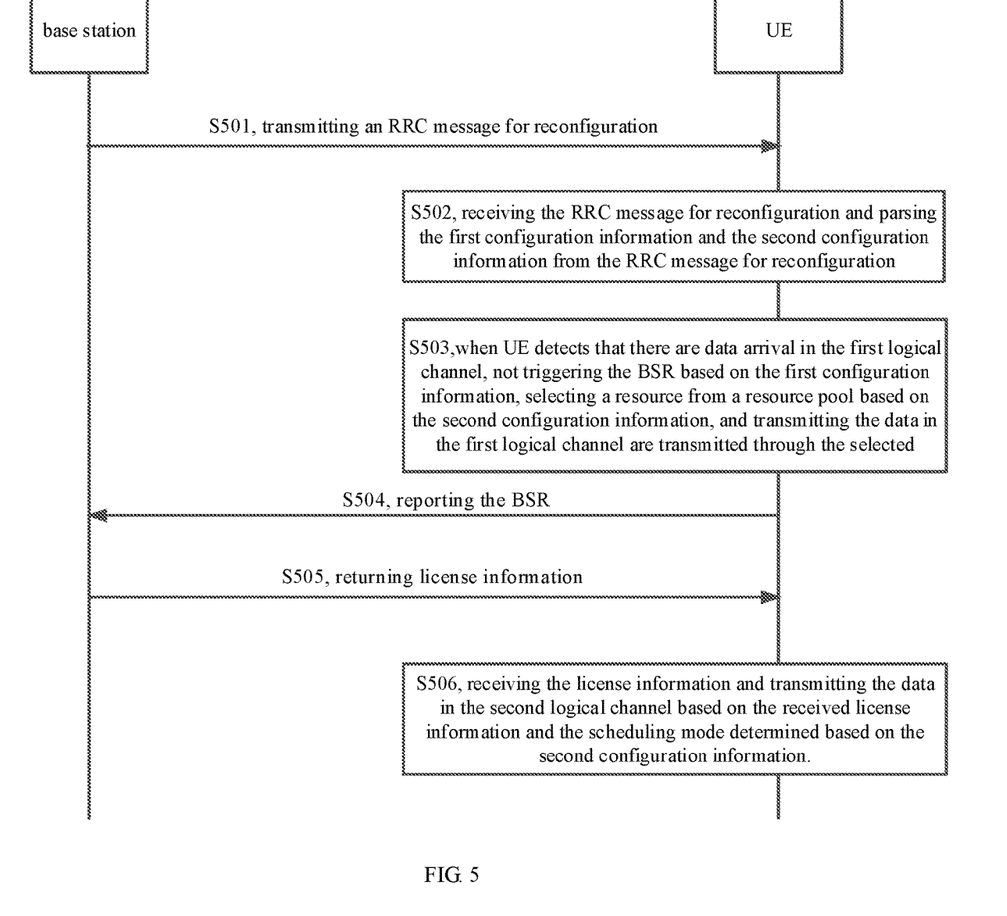
FIG. 5 is a flowchart illustrating signalings for a method for data transmission according to an example embodiment of the disclosure.

FIG. 5 is a flowchart illustrating signalings for a method for data transmission according to an example embodiment of the disclosure. The embodiments may be described from the perspective of interaction between a base station and UE. As illustrated in FIG. 5, the method includes the following.

At block S501, the base station transmits an RRC message for reconfiguration to the UE. The RRC message for reconfiguration may carry first configuration information and second configuration information. The first configuration information includes the BSR that is configured for the first logical channel of a Sidelink being shielded and the data transmission mode being the first transmission mode, and the BSR that is configured for the second logical channel of the Sidelink being not shielded and the data transmission mode being the second transmission mode. The second configuration information includes a first scheduling mode corresponding to the first transmission mode, a resource pool provided by the first scheduling mode, and a second scheduling mode corresponding to the second transmission mode.

At block S502, the UE receives the RRC message for reconfiguration and parses the first configuration information and the second configuration information from the RRC message for reconfiguration.

At block S503, when the UE detects that there are data arrival in the first logical channel, the BSR is not triggered based on the first configuration information, a resource is selected from a resource pool based on the second configuration information, and the data in the first logical channel are transmitted through the selected resource.

The resource pool is provided by the base station in advance to the UE, and the UE MAC (Media Access Control) may select resources from the resource pool.

At block S504, when the UE detects that there are data arrival in the second logical channel, the BSR is reported to the base station based on the first configuration information.

At block S505, the base station receives the BSR reported by the UE and returns license information for scheduling a Sidelink to the UE based on the BSR.

At block S506, the UE receives the license information for scheduling the Sidelink returned by the base station and transmits the data in the second logical channel based on the received license information and the scheduling mode determined based on the second configuration information.

In the above embodiments, the base station provides the first configuration information and the second configuration information for the UE so that the UE may transmit the data with two data transmission modes simultaneously and may support more services simultaneously.

Figure 6:
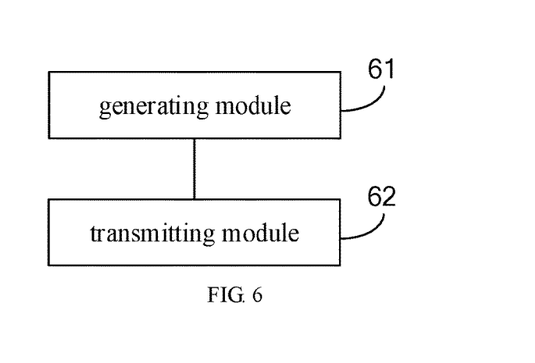
FIG. 6 is a block diagram illustrating an apparatus for configuring a data transmission mode according to an example embodiment of the disclosure.

FIG. 6 is a block diagram illustrating an apparatus for configuring a data transmission mode according to an example embodiment of the disclosure. The apparatus is located in the base station. As illustrated in FIG. 6, the apparatus includes a generating module 61 and a transmitting module 62.

The generating module 61 is configured to generate first configuration information for a preset link. The first configuration information includes information indicating whether preset information configured for each logical channel of the preset link is shielded, and a data transmission mode of each logical channel. The data transmission mode includes a first transmission mode and a second transmission mode. The first transmission mode is corresponding that the preset information is shielded, and the second transmission mode is corresponding that the preset information is not shielded The preset link may be a Sidelink. The preset information may be a buffer status report (BSR). The first transmission mode may be an independently-selected transmission mode. The second transmission mode may be a dynamic scheduling transmission mode.

In the embodiments, a Sidelink logical channel that is configured with the BSR shielded may not trigger the BSR.

In the embodiments, whether the preset information is shielded may be indicated by indication information, for example, may be indicated by indication information of 1 bit. When the indication information is 1, it represents that the preset information is shielded. When the indication information is 0, it represents that the preset information is not shielded.

In addition, whether the preset information is shielded is indicated in other ways, for example, may be indicated by a default configuration logical channel group.

In the embodiments, the first configuration information may include the information indicating whether the preset information configured for each logical channel of the preset link is shielded and the data transmission mode of each logical channel. The first configuration information may include the information indicating whether the preset information configured for each logical channel of the preset link is shielded. The first configuration information may include the data transmission mode of each logical channel.

When transmission modes of all logical channels of the preset link are all the dynamic scheduling modes, the first configuration information may only include the information indicating whether the preset information configured for each logical channel of the preset link is shielded.

In order to enable the UE transmit data with two data transmission modes simultaneously, the base station configures two resource scheduling modes for the UE simultaneously. The first scheduling mode corresponds to the first transmission mode. When the first transmission mode is an independently-selected transmission mode, the first scheduling mode is an independently-selected scheduling mode. The second scheduling mode corresponds to the second transmission mode. When the second transmission mode is a dynamic scheduling transmission mode, the second scheduling mode is a dynamic scheduling mode.

The resource pool provided by the first scheduling mode is a time domain resource range for the UE to automatically select.

The transmitting module 62 is configured to transmit the first configuration information generated by the generating module 61 to user equipment (UE)

The first configuration information and the second configuration information are carried in an RRC (Radio Resource Control) message.

In the embodiments, the first configuration information and the second configuration information may be transmitted to the UE after the first configuration information is generated for the preset link such as the Sidelink, thereby providing conditions for the UE to transmit data with two data transmission modes simultaneously.

In the above embodiments, the first configuration information and the second configuration information may be generated for the preset link and transmitted to the UE. The first configuration information includes two transmission modes. The two transmission modes may satisfy different service requirements and be supported simultaneously to enable the terminal support more services simultaneously.

Figure 7:
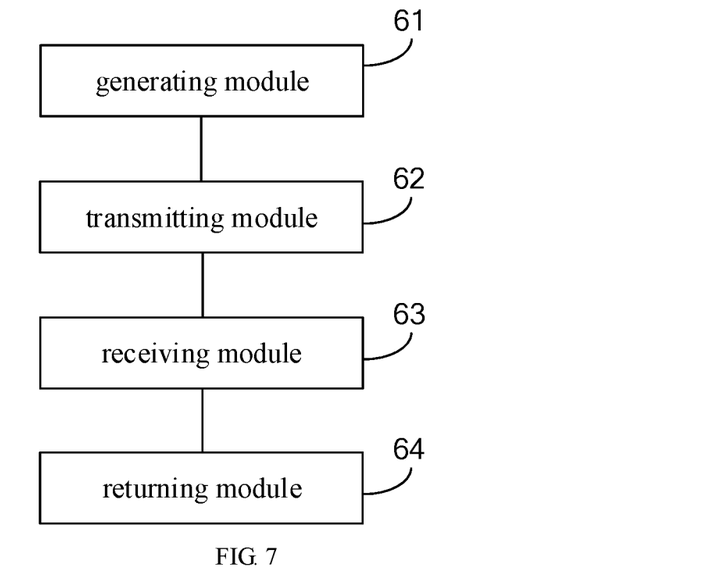
FIG. 7 is a block diagram illustrating another apparatus for configuring a data transmission mode according to an example embodiment of the disclosure.

FIG. 7 is a block diagram illustrating another apparatus for configuring a data transmission mode according to an example embodiment of the disclosure. As illustrated in FIG. 7, on the basis of the embodiments in FIG. 6, the apparatus may further include a receiving module 63 and a returning module 64.

The receiving module 63 is configured to receive the BSR reported by the UE based on the first configuration information transmitted by the transmitting module 62.

The returning module 64 is configured to return license information for scheduling the preset link to the UE based on the BSR received by the receiving module 63.

When the base station configures the BSR being shielded and a dynamic scheduling transmission mode for a certain logical channel of a preset link such as a Sidelink, and when there are data arrival on the logical channel, the UE may trigger and report the BSR based on the existing rule. The base station may return the license information for scheduling the preset link to the UE based on the BSR. The UE may schedule a resource to transmit data of the logical channel after receiving the license information.

In the above embodiments, the BSR reported by the UE is received, and the license information for scheduling the preset link is returned to the UE so that the UE may implement data transmission in time.

Figure 8:
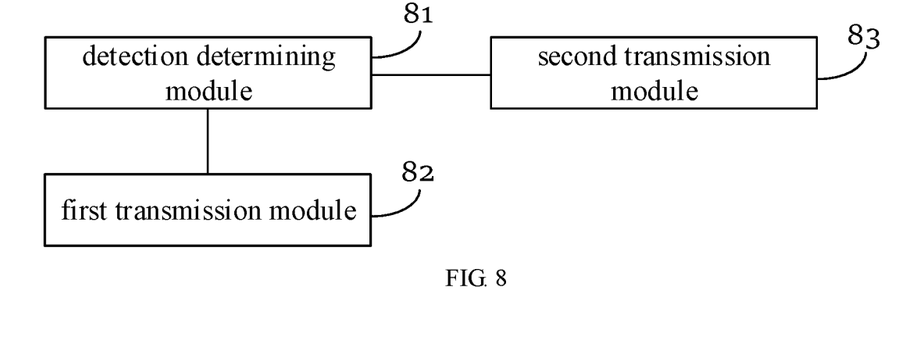
FIG. 8 is a block diagram illustrating an apparatus for data transmission according to an example embodiment of the disclosure.

FIG. 8 is a block diagram illustrating an apparatus for data transmission according to an example embodiment of the disclosure. The apparatus may be located in the UE. As illustrated in FIG. 8, the apparatus includes a detection determining module 81, a first transmission module 82 and a second transmission module 83.

The detection determining module 81 is configured to determine data transmission modes for a first logical channel and a second logical channel of a preset link respectively based on first configuration information received in advance, in response to detecting data arrival in the first logical channel and the second logical channel simultaneously.

The preset link may be a Sidelink. The preset information may be a BSR.

In the embodiments, a Sidelink logical channel that is configured with the BSR shielded may not trigger the BSR.

The first transmission module 82 is configured to transmit data in the first logical channel based on second configuration information and the data transmission mode determined by the detection determining module 91 for the first logical channel.

When the data transmission mode of the first logical channel is a first transmission mode, transmitting the data in the first logical channel based on the second configuration information and the data transmission mode determined for the first logical channel may include: selecting a resource from a resource pool provided by a first scheduling mode corresponding to the first transmission mode based on the second configuration information, and transmitting the data in the first logical channel through the selected resource.

The second transmission module 83 is configured to transmit data in the second logical channel based on the second configuration information and the data transmission mode determined by the detection determining module 81 for the second logical channel.

In the embodiments, when the data arrival in the first logical channel and the second logical channel of the preset link simultaneously are detected, the data transmission modes are determined for the first logical channel and the second logical channel based on the first configuration information received in advance, and the data in the first logical channel are transmitted based on the second configuration information and the data transmission mode determined for the first logical channel, and the data in the second logical channel are transmitted based on the second configuration information and the data transmission mode determined for the second logical channel, thereby enabling the simultaneous use of two data transmission modes to transmit data and simultaneously supporting more services.

Figure 9:
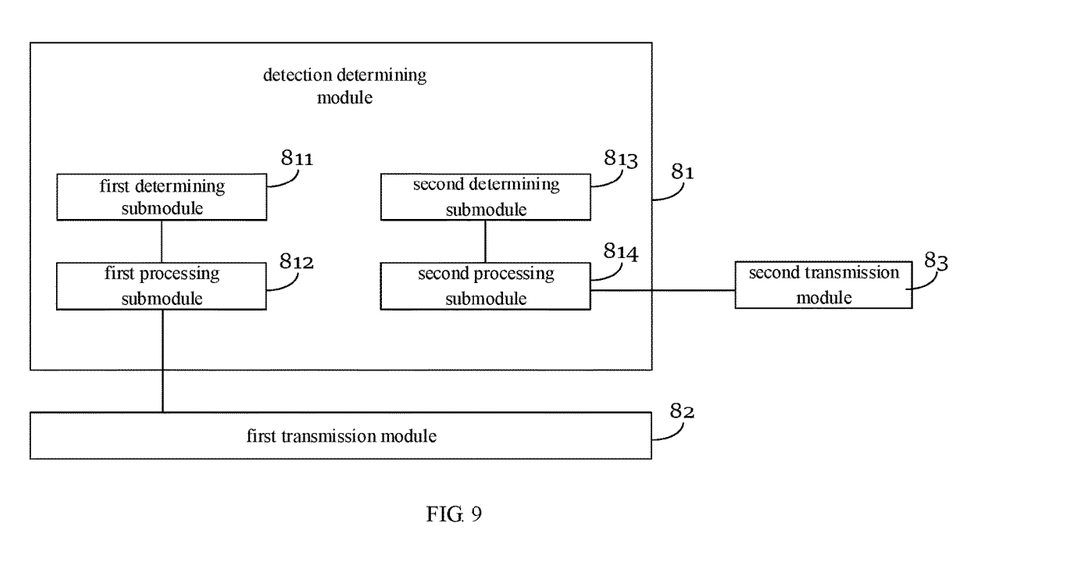
FIG. 9 is a block diagram illustrating another apparatus for data transmission according to an example embodiment of the disclosure.

FIG. 9 is a block diagram illustrating another apparatus for data transmission according to an example embodiment of the disclosure. As illustrated in FIG. 9, on the basis of the embodiments in FIG. 8, the detection determining module 81 may include a first determining submodule 811, a first processing submodule 812, a second determining submodule 813 and a second processing submodule 814.

The first determining submodule 811 is configured to determine whether preset information configured for the first logical channel is shielded and the data transmission mode of the first logical channel based on the first configuration information.

The first processing submodule 812 is configured to not trigger the preset information in response to that the first determining submodule 811 determines that the preset information configured for the first logical channel is shielded.

The second determining submodule 813 is configured to determine whether preset information configured for the second logical channel is shielded and the data transmission mode of the second logical channel based on the first configuration information.

The second processing submodule 814 is configured to report the preset information in response to that the second determining submodule 813 determines that the preset information configured for the second logical channel is not shielded.

In the embodiments, the data transmission modes are determined for the first logical channel and the second logical channel respectively, thereby providing conditions for subsequent transmission data.

Figure 10:
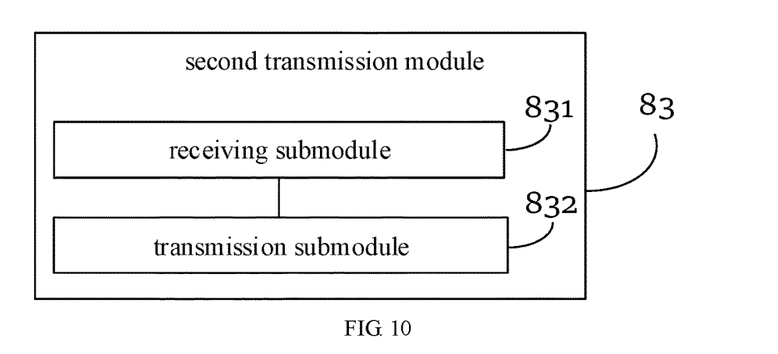
FIG. 10 is a block diagram illustrating another apparatus for data transmission according to an example embodiment of the disclosure.

FIG. 10 is a block diagram illustrating another apparatus for data transmission according to an example embodiment of the disclosure. As illustrated in FIG. 10, on the basis of the embodiments in FIG. 9, when the data transmission mode of the second logical channel is a second transmission mode, the second transmission mode 83 may include a receiving submodule 831 and a transmission submodule 832.

The receiving submodule 831 is configured to receive license information for scheduling the preset link, returned by the base station based on the preset information.

The transmission submodule 832 is configured to schedule a resource dynamically based on the license information received by the receiving submodule 831 and a second scheduling mode corresponding to the second transmission mode and transmit the data in the second logical channel through the scheduled resource.

In the above embodiments, the license information for scheduling the preset link returned by the base station based on the preset information is received, and the resource is scheduled dynamically based on the license information received by the receiving submodule and the second scheduling mode corresponding to the second transmission mode, and the data in the second logical channel are transmitted with the scheduled resource, thereby implementing data transmission with the second transmission mode.

Figure 11:
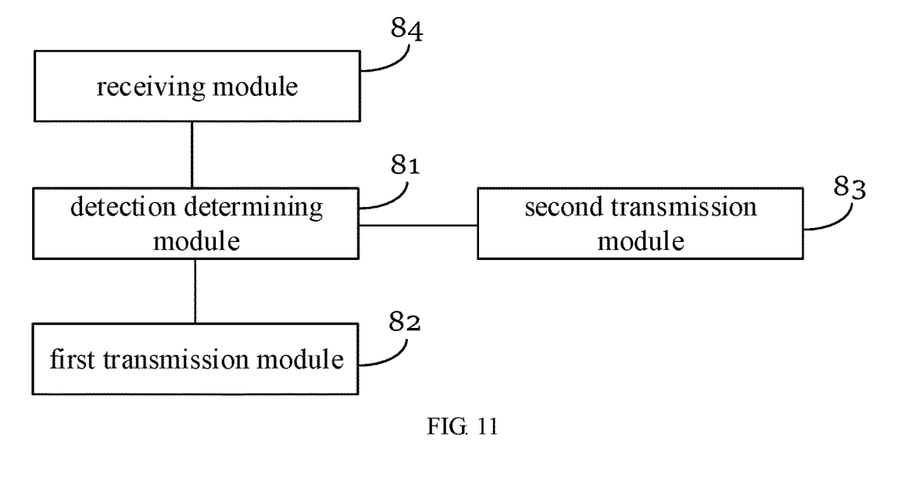
FIG. 11 is a block diagram illustrating another apparatus for data transmission according to an example embodiment of the disclosure.

FIG. 11 is a block diagram illustrating another apparatus for data transmission according to an example embodiment of the disclosure. As illustrated in FIG. 11, on the basis of the embodiments in FIG. 8, the apparatus may further include a receiving module 84.

The receiving module 84 is configured to receive the first configuration information and the second configuration information from a base station.

The first configuration information includes information indicating whether preset information configured for each logical channel of the preset link is shielded, and/or a data transmission mode of each logical channel. The data transmission mode includes a first transmission mode and a second transmission mode. The second configuration information includes a first scheduling mode corresponding to the first transmission mode, a resource pool provided by the first scheduling mode, and a second scheduling mode corresponding to the second transmission mode.

In the above embodiments, the first configuration information and the second configuration information are received so as to provide conditions for data transmission with two data transmission modes simultaneously.

Figure 12:
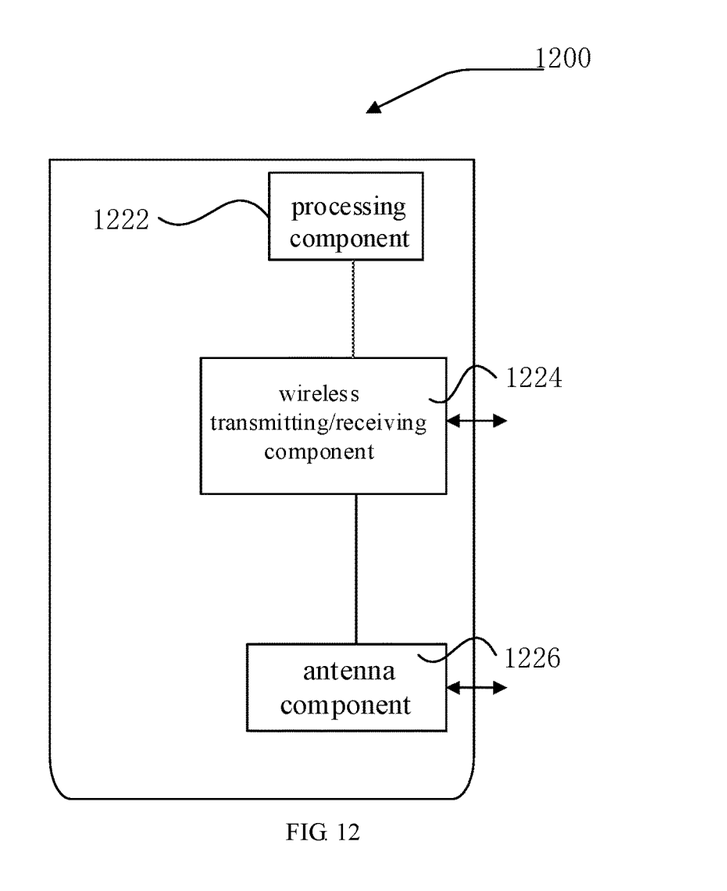
FIG. 12 is a block diagram illustrating a device for configuring a data transmission mode according to an example embodiment of the disclosure.

FIG. 12 is a block diagram illustrating a device for configuring a data transmission mode according to an example embodiment of the disclosure. The device 1200 may be provided as a base station. Referring to FIG. 12, the device 1200 includes a processing component 1222, a wireless transmitting/receiving component 1224, an antenna component 1226, and a signal processing unit peculiar to a wireless interface. The processing component 1222 may further include one or more processors.

One processor of the processing component 1222 may be configured to as follows.

The processor of the processing component 1222 may be configured to determine data transmission modes for a first logical channel and a second logical channel of a preset link respectively based on first configuration information received in advance, in response to detecting data arrival in the first logical channel and the second logical channel simultaneously.

The processor of the processing component 1222 may be configured to transmit data in the first logical channel based on second configuration information and the data transmission mode determined by the detection determining module for the first logical channel.

The processor of the processing component 1222 may be configured to transmit data in the second logical channel based on the second configuration information and the data transmission mode determined by the detection determining module for the second logical channel.

In some embodiments, a non-transitory computer-readable storage medium including instructions is further provided. The instructions may be executed by the processing component 1222 of the device 1200 to complete the above method for configuring the transmission mode. For example, the non-transitory computer-readable storage medium may be a read-only memory ROM, a random-access memory (RAM), a CD-ROM, a magnetic tape, a floppy disk, an optical data storage device, etc.

Figure 13:
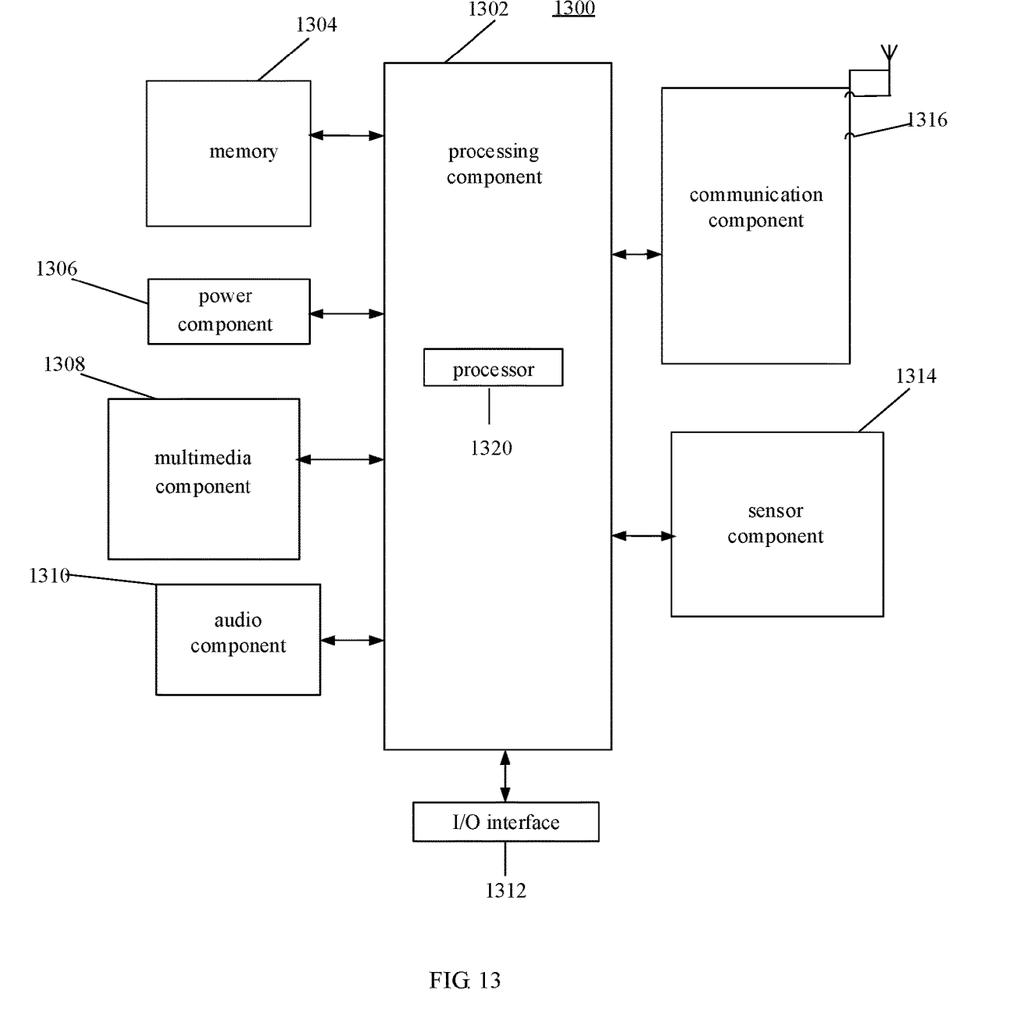
FIG. 13 is a block diagram illustrating a device for data transmission according to an example embodiment of the disclosure.

FIG. 13 is a block diagram illustrating a device for data transmission according to an example embodiment of the disclosure. The device 1300 may be a mobile phone, a computer, a digital broadcasting terminal, a messaging device, a game console, a tablet device, medical equipment, fitness equipment, a personal digital assistant, etc.

Referring to FIG. 13, the device 1300 may include one or more components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the actions in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

One processor 1320 of the processing component 1302 may be configured to as follows.

The processor 1320 of the processing component 1302 may be configured to generate first configuration information and second configuration information for a preset link, the first configuration information including information indicating whether preset information configured for each logical channel of the preset link is shielded, and/or a data transmission mode of each logical channel, the data transmission mode including a first transmission mode and a second transmission mode, and the second configuration information including a first scheduling mode corresponding to the first transmission mode, a resource pool provided by the first scheduling mode, and a second scheduling mode corresponding to the second transmission mode.

The processor 1320 of the processing component 1302 may be configured to transmit the first configuration information and the second configuration information to user equipment (UE).

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as Wi-Fi, or 3Q or a combination thereof. In one embodiment, the communication component 1316 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

With respect to the apparatus embodiments, since they basically correspond to the method embodiments, relevant parts of the apparatus embodiments may refer to parts of the description of the method embodiments. The apparatus embodiments described above are merely illustrative. The units described above as separate components may or may not be physically separated, and the components displayed as units may or may not be physical units, that is, they may be located in one place or distributed to multiple network units. Some or all of the modules may be selected based on actual needs to achieve the objectives of the solutions of the disclosure. Those of ordinary skill in the art may understand and implement it without creative work.

It should be noted that, in the specification, relational terms such as first and second are used herein to distinguish one entity or operation from another entity or operation without necessarily requiring or implying any such actual relationship or order between such entities or operations. The terms "comprise", "includes" or any other variations thereof, are intended to cover a non-exclusive inclusion, such that a process, a method, an article or a device including a series of elements not only includes those elements but also includes other elements not expressly listed, or may further include elements inherent to such process, method, article, or device. In the absence of more constraints, elements defined by a sentence "include one . . . " do not preclude the presence of additional identical elements in the process, method, article, or device including the elements.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

The technical solutions provided in embodiments of the disclosure may include the following beneficial effects.

The first configuration information and the second configuration information may be generated for the preset link and transmitted to the UE. The first configuration information includes two transmission modes. The two transmission modes may satisfy different service requirements and be supported simultaneously to enable the terminal support more services simultaneously.

When the data arrival in the first logical channel and the second logical channel of the preset link simultaneously are detected, the data transmission modes are determined for the first logical channel and the second logical channel based on the first configuration information received in advance, and the data in the first logical channel are transmitted based on the second configuration information and the data transmission mode determined for the first logical channel, and the data in the second logical channel are transmitted based on the second configuration information and the data transmission mode determined for the second logical channel, thereby enabling the simultaneous use of two data transmission modes to transmit data and simultaneously supporting more services.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for configuring a data transmission mode, for a base station, comprising:
generating first configuration information and second configuration information for a preset link, the first configuration information comprising information indicating whether preset information configured for each logical channel of the preset link is shielded, and a data transmission mode of each logical channel, the data transmission mode comprising a first transmission mode and a second transmission mode, and the second configuration information comprising a first scheduling mode corresponding to the first transmission mode, a resource pool provided by the first scheduling mode, and a second scheduling mode corresponding to the second transmission mode; and
transmitting the first configuration information and the second configuration information to user equipment (UE).

2. The method as claimed in claim 1, wherein, the first scheduling mode comprises an independently-selected scheduling mode, and the second scheduling mode comprises a dynamic scheduling mode.

3. The method as claimed in claim 1, wherein, the preset information comprises a buffer status report (BSR).

4. The method as claimed in claim 3, further comprising:
receiving the BSR reported by the UE; and
returning license information for scheduling the preset link to the UE based on the BSR.

5. The method as claimed in claim 1, wherein, the information indicating whether the preset information is shielded is indicated by a bit; or
the information indicating the preset information is shielded is indicated by a default configuration logical channel group.

6. A non-transitory computer-readable storage medium having stored therein computer instructions that, when executed by a processor, actions in the method as claimed in claim 1.

7. A method for data transmission, for user equipment (UE), comprising:
determining data transmission modes for a first logical channel and a second logical channel of a preset link respectively based on first configuration information received in advance, in response to detecting data arrival in the first logical channel and the second logical channel simultaneously;
transmitting data in the first logical channel based on second configuration information and the data transmission mode determined for the first logical channel; and
transmitting data in the second logical channel based on the second configuration information and the data transmission mode determined for the second logical channel.

8. The method as claimed in claim 7, wherein, determining the data transmission modes for the first logical channel and the second logical channel of the preset link respectively based on the first configuration information received in advance, comprises:
determining whether preset information configured for the first logical channel is shielded and the data transmission mode of the first logical channel based on the first configuration information;
not triggering the preset information in response to that the preset information configured for the first logical channel is shielded;
determining whether preset information configured for the second logical channel is shielded and the data transmission mode of the second logical channel based on the first configuration information; and
reporting the preset information in response to that the preset information configured for the second logical channel is not shielded.

9. The method as claimed in claim 8, wherein, transmitting the data in the first logical channel based on the second configuration information and the data transmission mode determined for the first logical channel, in response to that the data transmission mode of the first logical channel is a first transmission mode, comprises:
selecting a resource from a resource pool provided by a first scheduling mode corresponding to the first transmission mode based on the second configuration information, and transmitting the data in the first logical channel through the selected resource;
transmitting the data in the second logical channel based on the second configuration information and the data transmission mode determined for the second logical channel, in response to that the data transmission mode of the second logical channel is a second transmission mode, comprises:
receiving license information for scheduling the preset link, returned by a base station based on the preset information;
scheduling a resource dynamically based on the license information and a second scheduling mode corresponding to the second transmission mode, and transmitting the data in the second logical channel through the scheduled resource.

10. The method as claimed in claim 8, wherein, the first scheduling mode comprises an independently-selected scheduling mode, and the second scheduling mode comprises a dynamic scheduling mode.

11. The method as claimed in claim 8, wherein, the preset information comprises a buffer status report (BSR).

12. The method as claimed in claim 7, further comprising:
receiving the first configuration information and the second configuration information from a base station.

13. A non-transitory computer-readable storage medium having stored therein computer instructions that, when executed by a processor, actions in the method as claimed in claim 7.

14. A base station, comprising:
a processor;
a memory configured to store instructions executable by the processor;
wherein, the processor is configured to:
generate first configuration information and second configuration information for a preset link, the first configuration information comprising information indicating whether preset information configured for each logical channel of the preset link is shielded, and a data transmission mode of each logical channel, the data transmission mode comprising a first transmission mode and a second transmission mode, and the second configuration information comprising a first scheduling mode corresponding to the first transmission mode, a resource pool provided by the first scheduling mode, and a second scheduling mode corresponding to the second transmission mode; and transmit the first configuration information and the second configuration information to user equipment (UE).

15. The base station as claimed in claim 14, wherein, the first scheduling mode comprises an independently-selected scheduling mode, and the second scheduling mode comprises a dynamic scheduling mode.

16. The base station as claimed in claim 14, wherein, the preset information comprises a buffer status report (BSR).

17. The base station as claimed in claim 16, wherein the processor is further configured to:

receive the BSR reported by the UE; and return license information for scheduling the preset link to the UE based on the BSR.

18. The base station as claimed in claim 14, wherein, the information indicating whether the preset information is shielded is indicated by a bit; or the information indicating the preset information is shielded is indicated by a default configuration logical channel group.

19. A user equipment (UE), comprising:

a processor;

a memory configured to store instructions executable by the processor;

the processor is configured to: perform the method as claimed in claim 7.

* * * * *